United States Patent
Gondoh et al.

(10) Patent No.: US 10,336,561 B2
(45) Date of Patent: Jul. 2, 2019

(54) ARTICLE LOADING FACILITY

(71) Applicant: Daifuku Co., Ltd., Osaka-shi (JP)

(72) Inventors: Takuya Gondoh, Tokyo (JP); Shigeru Sugano, Hinocho (JP); Atsushi Kurayama, Tokyo (JP); Masami Iwai, Tokyo (JP); Atsushi Minoo, Tokyo (JP)

(73) Assignee: DAIFUKU CO., LTD., Osaka-Shi (JP)

( * ) Notice: Subject to any disclaimer, the term of this patent is extended or adjusted under 35 U.S.C. 154(b) by 0 days.

(21) Appl. No.: 15/696,545

(22) Filed: Sep. 6, 2017

(65) Prior Publication Data

US 2018/0065817 A1 Mar. 8, 2018

(30) Foreign Application Priority Data

Sep. 7, 2016 (JP) .................................. 2016-174926

(51) Int. Cl.
*B65G 57/22* (2006.01)
*B65G 57/16* (2006.01)
(Continued)

(52) U.S. Cl.
CPC ............. *B65G 57/22* (2013.01); *B65G 57/04* (2013.01); *B65G 57/16* (2013.01); *B65G 60/00* (2013.01);
(Continued)

(58) Field of Classification Search
CPC ......... B65G 57/22; B65G 57/16; B65G 60/00
See application file for complete search history.

(56) References Cited

U.S. PATENT DOCUMENTS 3,586,176 A * 6/1971 Rackman .................. B25J 9/026
  414/792
3,850,313 A * 11/1974 Rackman ............... B65G 57/22
  414/591

(Continued)

FOREIGN PATENT DOCUMENTS

JP 201540120 A 3/2015

*Primary Examiner* — Thomas Randazzo
(74) *Attorney, Agent, or Firm* — The Webb Law Firm

(57) ABSTRACT

An article loading facility includes: a transport unit; a loading unit; a setting unit; a first control unit; and a second control unit. The transport unit transports second supporting members from storage units to a transfer position. The loading unit loads target articles that are supported by the second supporting members, onto the first supporting member. The setting unit performs an arrangement setting process to set arrangement information for each of the plurality of target articles that are to be loaded onto the first supporting member, the arrangement information indicating the orientation and the position of the corresponding target article relative to the first supporting member, and performs an arrangement order setting process to set a type arrangement order that, when target articles of a plurality of types are to be loaded according to the arrangement information, indicates the order in which the plurality of types are to be arranged. The second control unit controls the transport unit to transport the second supporting members to the transfer position according to the type arrangement order. The first control unit controls the loading unit to load the target articles onto the first supporting member according to the arrangement information that has been set in the arrangement setting process.

9 Claims, 5 Drawing Sheets

(51) Int. Cl.
*B65G 60/00* (2006.01)
*B65G 57/04* (2006.01)
*B65G 61/00* (2006.01)
*B65G 65/00* (2006.01)
*G06Q 10/04* (2012.01)

(52) U.S. Cl.
CPC .......... *B65G 61/00* (2013.01); *B65G 65/005* (2013.01); *G06Q 10/043* (2013.01)

(56) References Cited

U.S. PATENT DOCUMENTS

| | | | | |
|---|---|---|---|---|
| 4,692,876 | A * | 9/1987 | Tenma | B65G 1/1371 414/791.6 |
| 5,175,692 | A * | 12/1992 | Mazouz | B65G 61/00 414/900 |
| 5,501,571 | A * | 3/1996 | Van Durrett | B65G 61/00 414/21 |
| 9,828,128 | B1 * | 11/2017 | Linnell | B65B 59/02 |
| 2010/0178149 | A1 * | 7/2010 | Fritzsche | B65G 57/22 414/789.5 |
| 2015/0073588 | A1 * | 3/2015 | Priebe | B65G 57/26 700/217 |

* cited by examiner

Fig.6
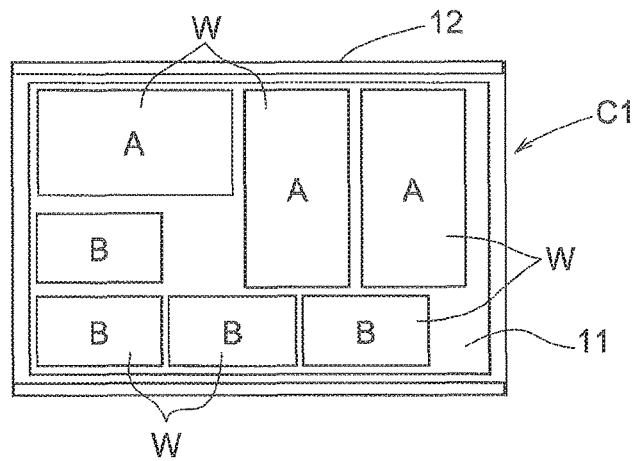
Fig.7
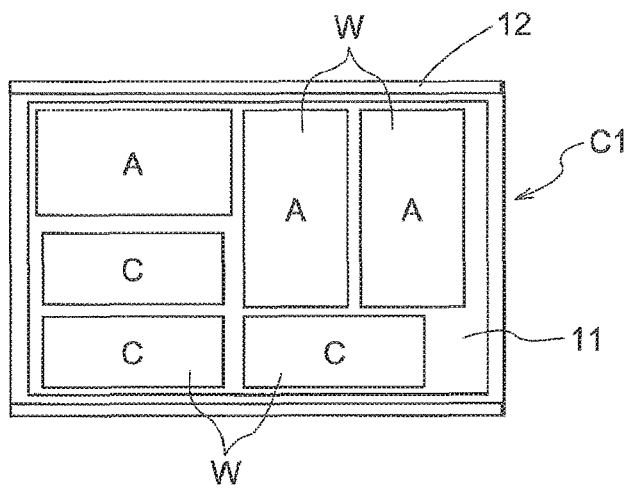
Fig.8
| ORDER NO. | PRODUCT CODE | NUMBER OF ARTICLES |
|---|---|---|
| 001 | A | 3 |
| 001 | C | 3 |
| 001 | B | 5 |
| 001 | D | 2 |

ARTICLE LOADING FACILITY

CROSS-REFERENCE TO RELATED APPLICATION

This application claims priority to Japanese Patent Application No. 2016-174926 filed Sep. 7, 2016, the disclosure of which is hereby incorporated in its entirety by reference.

BACKGROUND OF THE INVENTION

Field of the Invention

The present invention relates to an article loading facility that includes: a loading unit that loads a plurality of target articles onto one first supporting member; a first control unit that controls the loading unit; and a setting unit that performs an arrangement setting process to set arrangement information for each of the plurality of target articles that are to be loaded onto the first supporting member, the arrangement information indicating the orientation and the position of the corresponding target article relative to the first supporting member, wherein the first control unit controls the loading unit based on the arrangement information so that the plurality of target articles are loaded onto the first supporting member according to the respective orientations and positions of the plurality of target articles indicated by the arrangement information.

Description of the Related Art

An example of the above-described article loading facility is disclosed in JP 2015-040120A (Patent Document 1). According to the article loading facility disclosed in Patent Document 1, target articles are stored in an automated warehouse, and the article loading facility is configured to transport the target articles in the automated warehouse to a transfer point one by one, using a stacker crane and a transport conveyer. In the article loading facility according to Patent Document 1, a control unit activates a transfer robot (the loading unit) to load the target articles, which have been transported to the transfer point, onto a cage cart (the first supporting member), and the transfer robot loads the target articles onto the cage cart according to orientations and positions that are indicated by the arrangement information.

SUMMARY OF THE INVENTION

In the article loading facility disclosed in Patent Document 1 above, for example, if the time from when the transfer robot removes a target article at the transfer point to when the next target article is transported to the transfer point by the conveyer is longer than the time required for the transfer robot to transfer a target article from the transfer point to the first supporting member, the transfer robot needs to wait, and hence it takes a longer time to load a plurality of target articles onto the first supporting member.

Therefore, there is demand for an article loading facility that can reduce the time required to load a plurality of target articles onto the first supporting member.

An article loading facility according to the present disclosure includes: a loading unit that loads a plurality of target articles onto one first supporting member; a first control unit that controls the loading unit; and a setting unit that performs an arrangement setting process to set arrangement information for each of the plurality of target articles that are to be loaded onto the first supporting member, the arrangement information indicating the orientation and the position of the corresponding target article relative to the first supporting member, wherein the first control unit controls the loading unit based on the arrangement information so that the plurality of target articles are loaded onto the first supporting member according to the respective orientations and positions of the plurality of target articles indicated by the arrangement information.

The article loading facility further includes: storage units that store therein second supporting members that support the target articles on a type-by-type basis; a transport unit that transports the second supporting members from the storage units to a transfer position, and transports the second supporting members from the transfer position to the storage units; and a second control unit that controls the transport unit. The loading unit takes out target articles that are supported by a second supporting member that is located at the transfer position, and loads the target articles onto the first supporting member. In the arrangement setting process, the setting unit performs an arrangement order setting process to set the arrangement information that indicates an arrangement that, after all target articles of a first type have been loaded onto the first supporting member, allows all target articles of a second type, which is different from the first type, onto the first supporting member, and to set a type arrangement order that, when target articles of a plurality of types are to be loaded according to the arrangement information, indicates the order in which the plurality of types are to be arranged. The second control unit controls the transport unit to transport the second supporting members to the transfer position according to the type arrangement order, and the first control unit controls the loading unit to load the target articles onto the first supporting member according to the arrangement information that has been set in the arrangement setting process.

With this configuration, the arrangement information and the type arrangement order that are set by the setting unit in the arrangement setting process are pieces of information that, after all of the target articles of the first type have been loaded onto the first supporting member, allows all of the target articles of the second type, which is different from the first type, to be loaded onto the first supporting member. Specifically, if there are target articles of three types, namely type A, type B, and type C, which are to be loaded onto one first supporting member, and the type arrangement order is type A, type B, and type C in the stated order, the arrangement information is as follows. That is, if type A, which comes first out of types A to C, is defined as the first type, and the other types, namely types B and C, are defined as the second types, the arrangement information allows all of the articles of type A, which is the first type, to be loaded onto the first supporting member before the articles of type B and type C, which are the second types. Also, if type B, which comes first out of the remaining types B and C, is defined as the first type, and the other type, namely type C, is defined as the second type, the arrangement information allows all of the articles of type B, which is the first type, to be loaded onto the first supporting member before the articles of type C, which is the second type. That is, according to the arrangement information, it is possible to load the target articles onto the first supporting member by loading all of the articles of type A, which are to be dispatched first, onto the first supporting member, then loading all of the articles of type B, which are to be dispatched next, onto the first supporting member, and thereafter loading all of the articles of type C, which are to be dispatched last, onto the first supporting member.

Then, the second control unit controls the transport unit to transport the second supporting members to the transfer position according to the type arrangement order. Specifically, if the type arrangement order indicates the order of type A, type B, and type C, the second control unit controls the transport unit such that a second supporting member on which articles of type A have been loaded is first transported to the transfer position, then a second supporting member on which articles of type B have been loaded is transported to the transfer position, and thereafter a second supporting member on which articles of type C have been loaded is transported to the transfer position. In this way, second supporting members are transported to the transfer position according to the type arrangement order, and the first control unit controls the loading unit, and consequently it is possible to load the target articles onto the first supporting member according to the arrangement information that has been set in the arrangement setting process.

Therefore, it is possible to transport a plurality of articles all at once to the transfer position by transporting a second supporting member onto which the articles have been loaded, to the transfer position, and it is unnecessary to transport a second supporting member onto which target articles of the same type have been loaded, to the transfer position a plurality of times. Therefore, it is possible to reduce the time required to load a plurality of target articles onto the first supporting member.

BRIEF DESCRIPTION OF THE DRAWINGS

FIG. 6 is a diagram showing the arrangement of articles in the first tier when the articles are arranged in the order of product codes A, B, C, and D.
FIG. 7 is a diagram showing the arrangement of articles in the first tier when the articles are arranged in the order of product codes A, C, B, and D.
FIG. 8 is a diagram showing arrangement order information after rearrangement.

DETAILED DESCRIPTION OF PREFERRED EMBODIMENTS

The following describes embodiments of an article loading facility with reference to the drawings.

Figure 1:
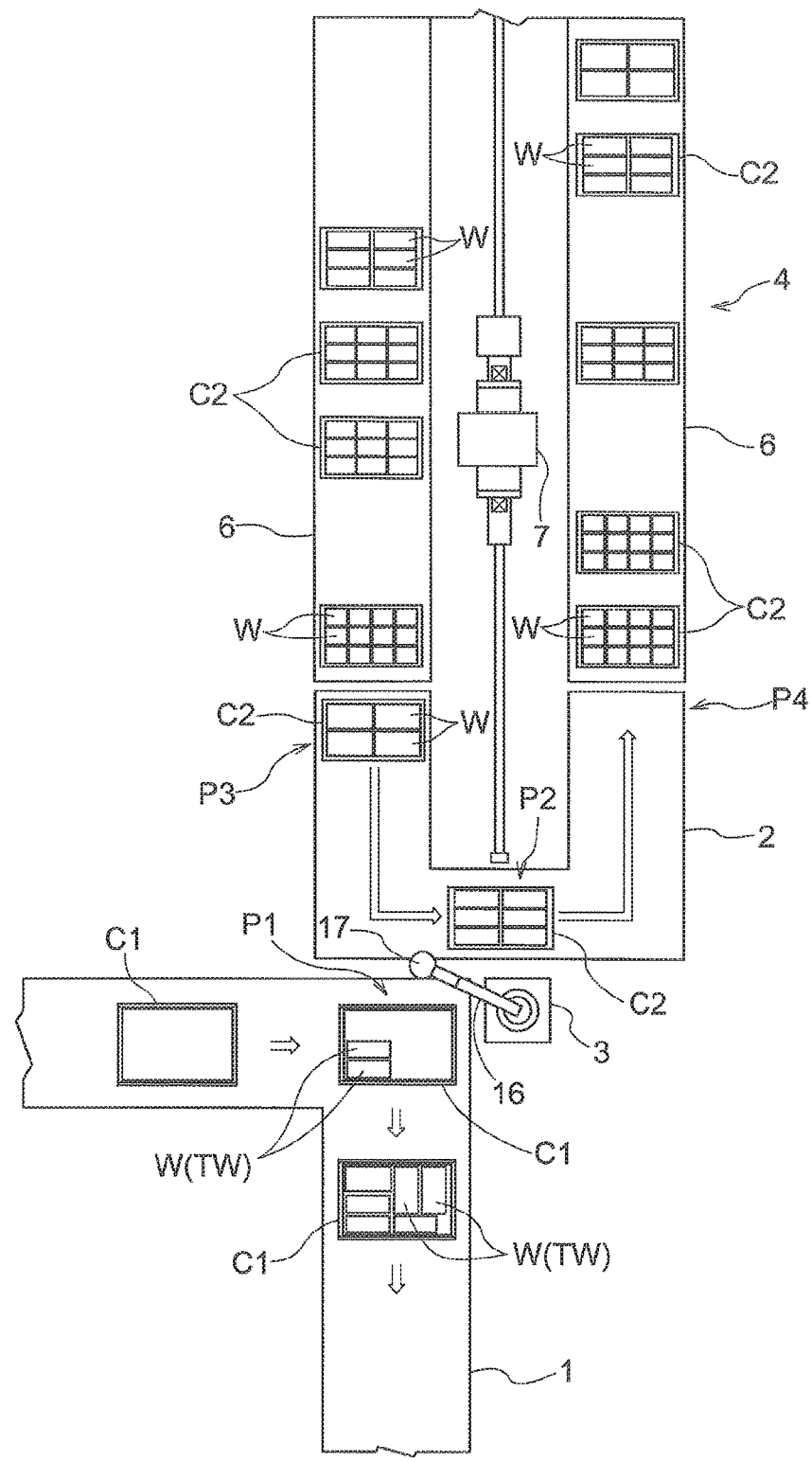
FIG. 1 is a plan view of an article loading facility.

As shown in FIG. 1, the article loading facility includes: a first transport device 1 that transports first containers C1; a second transport device 2 that transports second containers C2; and a transfer device 3 that transfers articles W that are stored in the second containers C2 to the first containers C1, to store the articles W in the first containers C1. The article loading facility also includes an automated warehouse 4 in which the second containers C2 are stored.

Automated Warehouse

As shown in FIG. 1, the automated warehouse 4 includes a storage rack 6 that stores therein the second containers C2, and a stacker crane 7 that transports the second containers C2. The storage rack 6 includes a plurality of storage units that are arranged along the travelling direction of the stacker crane 7 and along the vertical direction. The storage rack 6 is configured to store therein a plurality of second containers C2 such that the plurality of second containers C2 are stored in the storage units.

The automated warehouse 4 transports a second container C2 that is stored in the storage rack 6 to an unloading position P3 using the stacker crane 7, to unload the second container C2 from the automated warehouse 4, and transports a second container C2 at a loading position P4 to the storage rack 6 using the stacker crane 7, to load the second container C2 to the automated warehouse 4.

First Transport Device and Second Transport Device

The first transport device 1 includes a conveyer such as a roller conveyer, and transports the first containers C1 in one direction. A first position P1 is set midway in the transport path of the first transport device 1. The first transport device 1 transports the first containers C1 from a transport source (not shown) to the first position P1, and also transports the first containers C1 from the first position P1 to the transport destination (not shown). No articles W are stored in the first containers C1 that are transported to the first position P1 by the first transport device 1, whereas articles W that have been transported by the transfer device 3 are stored in the first containers C1 that are transported from the first position P1 by the first transport device 1.

The second transport device 2 includes a conveyer such as a roller conveyer, and transports the second containers C2 in one direction. The unloading position P3 is set at the upstream end of the transport path of the second transport device 2, the loading position P4 is set at the downstream end of the transport path of the second transport device 2, and a second position P2 is set midway in the transport path of the second transport device 2. The second transport device 2 transports the second containers C2 from the unloading position P3 to the second position P2, and transports the second containers C2 from the second position P2 to the loading position P4. One or more articles W are stored in the second containers C2 that are transported to the second position P2 by the second transport device 2, and articles W that are stored in one second container C2 are articles W of the same type.

That is, in the article loading facility, a first container C1 that is empty is transported to the first position P1 by the first transport device 1. Also, a second container C2 in which articles W are stored is unloaded from the automated warehouse 4 by the stacker crane 7, and the second container C2 thus unloaded is transported to the second position P2 by the second transport device 2.

The transfer device 3 takes articles W out of a second container C2 that is located at the second position P2, and transfers the articles W thus taken out, from the second container C2 to a first container C1 that is located at the first position P1, so that the articles W are stored in the first container C1. The second container C2, from which all of the articles W that are to be taken out have been taken out, is transported from the second position P2 by the second transport device 2 and is loaded to the automated warehouse 4. The first container C1, in which all of the articles W that are to be stored are stored, is transported from the first position P1 by the first transport device 1. In the following description, an article W that is to be transferred to a first container C1, out of articles W that are stored in a second container C2 that has been transported to the second position P2, is referred to as a target article TW.

Note that the storage rack 6 corresponds to storage units that store therein the second containers C2 (the second supporting members). The stacker crane 7 and the second transport device 2 constitute a transport unit that transports second containers C2 from the storage rack 6 to the second position P2 (the transfer position), and transports second containers C2 from the second position P2 to the storage rack 6.

Containers

Figure 2:
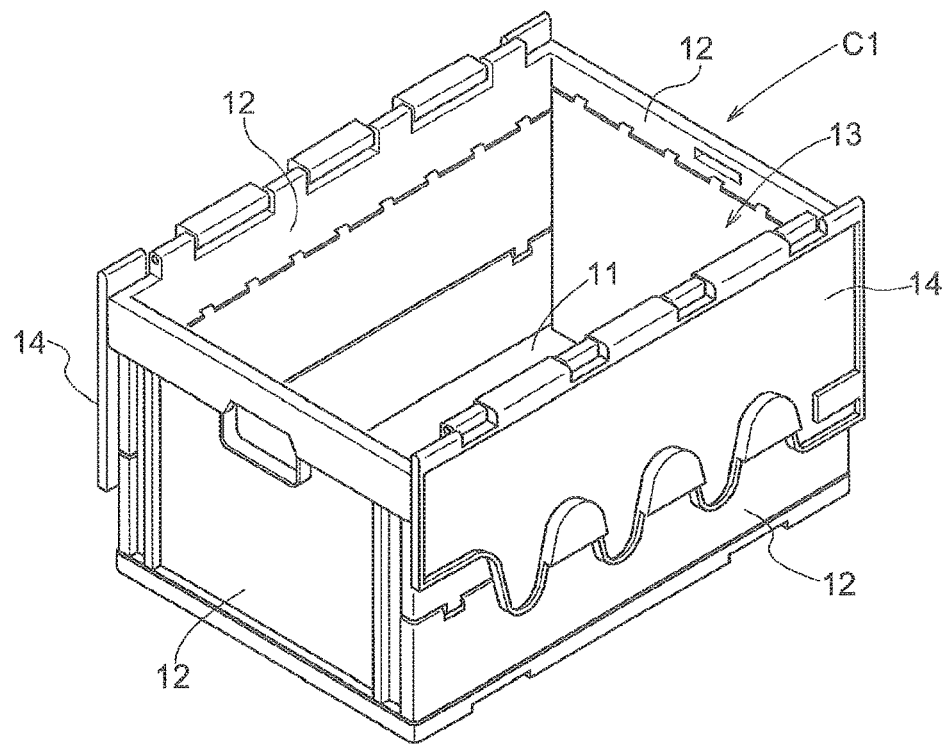
FIG. 2 is a perspective view of a first container.

As shown in FIG. 2, each first container C1 includes a supporting portion 11 that has a rectangular shape and supports articles W from below, and side wall portions 12 that respectively stand upright on four sides that constitute an outer edge of the supporting portion 11. Thus, each first container C1 is formed so as to have a box shape with an open upper face. Each first container C1 also includes a lid member 14 that can be switched to a closed state in which the lid member 14 closes an opening 13 in the upper surface, and an open state in which the lid member 14 opens the opening 13 in the upper surface. Each first container C1 stores therein articles W such that one or more tiers of articles W are stacked in the vertical direction on the supporting portion 11.

As with the first containers C1, each second container C2 includes the supporting portion 11 that has a rectangular shape and supports articles W from below, and the side wall portions 12 that respectively stand upright on four sides that constitute an outer edge of the supporting portion 11. Thus, each second container C2 is formed so as to have a box shape with an open upper face, and stores therein articles W such that the articles W are supported by the supporting member 11 from below.

In the present embodiment, foldable containers made of resin are used as the first containers C1 and the second containers C2. Containers without the lid member 14 may be used as the first containers C1. The capacity of each first container C1 and each second container C2 can be calculated based on the inner dimensions of each container. For example, the capacity of each of the containers with the lid member 14 (the first containers C1) can be calculated by the inside width×the inside length×the height (the length from the upper surface of the supporting portion 11 to the lower surface of the lid member 14 in the closed state), and the capacity of each of the containers without the lid member 14 (the second containers C2) can be calculated by the inside width×the inside length×the height (the length from the upper surface of the supporting portion 11 to the upper ends of the side wall portions 12). In the present embodiment, loading articles W onto the first containers C1 and the second containers C2 is expressed as storing articles W in the first containers C1 and the second containers C2.

A loading area in which articles W are stored is formed in the inner space of each first container C1 and the inner space of each second container C2. Note that first containers C1 with the lid member 14 in the open state correspond to the first supporting member, and the second containers C2 correspond to second supporting members that support target articles TW on a type-by-type basis.

Articles W have a rectangular parallelepiped shape (are formed so as to have a rectangular parallelepiped external shape), and there are various types of articles W. Articles W of the same type have the same length, width, and height. That is, when two articles W are of the same type, these two articles W have the same length, width, and height, whereas when two articles W are of different types, these two articles W may have the same length, width, and height, or be different in one or more or all of length, width, and height.

Articles W of a plurality of types are stored in second containers C2 on a type-by-type basis. That is, one or more articles W of one type are stored in each second container C2. A first container C1 stores therein articles W that have been transferred thereto from one second container C2 or a plurality of second containers C2. Therefore, articles W of one type or articles W of a plurality of types may be stored in a first container C1.

Articles W are stored in the second containers C2 so as to be in an appropriate orientation. More specifically, each article W is stored in the corresponding second container C2 in an orientation (the appropriate orientation) in which supported surfaces of each article W are parallel with the bottom surface of the container (the upper surface of the supporting portion 11), the supported surfaces being predetermined two surfaces that are parallel with each other. That is, if an article W in an appropriate orientation is inverted upside down, the article W will still be in an appropriate orientation, and if an article W in an appropriate orientation is rotated about an axis that is orthogonal to the supported surfaces of the article W, the article W will still be in an appropriate orientation.

The first containers C1 store therein articles W that have been transferred thereto by the transfer device 3, such that the articles W are in an appropriate orientation. The length in the vertical direction of an article W in an appropriate orientation is referred to as "the height", and the length in the lengthwise direction of the article W when viewed in the vertical direction is referred to as "the length", and the length in the lateral direction of the article W when viewed in the vertical direction is referred to as "the width".

Transfer Device

The transfer device 3 includes an arm 16 that has a plurality of joints, and a suction pad 17 that is supported at the leading end of the arm 16. The transfer device 3 is configured to suck and support an article W using the suction pad 17. The transfer device 3 takes articles W out of a second container C2 that is located at the second position P2, and transfers the articles W thus taken out, from the second container C2 to a first container C1 that is located at the first position P1, so that the articles W are stored in the first container C1.

The suction pad 17 is configured to be swingable about an axis that extends along the vertical direction, and swingable about an axis that extends along a horizontal direction, relative to the arm 16. The transfer device 3 is configured to change the orientation of an article W that is sucked and supported by the suction pad 17, about the axis that extends along the vertical direction and the axis that extends along the horizontal direction, by bending and stretching the arm 16 at the joints thereof, and swinging the suction pad 17 relative to the arm 16.

The transfer device 3 is configured to perform a transfer operation to transfer an article W from a second container C2 to a first container C1. In this transfer operation, the upper surface of an article W that is stored in a second container C2 in a given orientation is sucked and supported by the suction pad 17, thereafter the article W thus supported is moved to a position that is immediately above the supporting portion 11 of a first container C1 so as to be in the same orientation as the orientation when the article W was sucked, and then the article W is released from the sucked state. As a result of such a transfer operation, an article W that was stored in a second container C2 in an appropriate orientation can be stored in a first container C1 in an appropriate orientation.

Note that the transfer device 3 corresponds to a loading unit that loads a plurality of target articles TW into a first container C1 (the first supporting member), and the suction pad 17 corresponding to a sucking portion that sucks and supports the upper surface of each target article TW, the upper surface being a surface that faces upward.

Control Device

Figure 3:
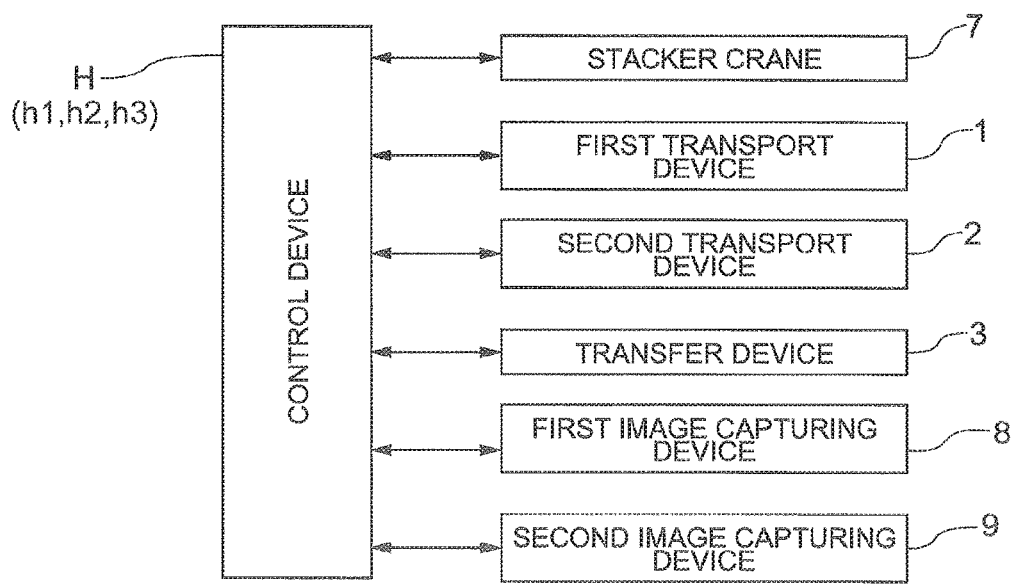
FIG. 3 is a control block diagram.

As shown in FIG. 3, the article loading facility includes a control device H that controls the first transport device 1, the second transport device 2, the transfer device 3, and the stacker crane 7. The control device H has the function of a first control unit h1 that controls the transfer device 3, and the function of a second control unit h2 that controls the first transport device 1, the second transport device 2, and the stacker crane 7. The control device H also has the function of a setting unit h3 that performs an arrangement setting process to set arrangement information for each of one or more target articles TW that are to be stored in a first container C1, the arrangement information indicating the orientation and the position of the corresponding target article TW relative to the first container C1.

Articles W of a plurality of types are respectively assigned product codes that differ according to type. The control device H stores therein sets of a product code and article information in association with each other, the article information indicating the length, width, height, and weight of an article W of the type indicated by the corresponding product code. The control device H also stores therein storage position information of a second container C2 that is stored in the automated warehouse 4, and the product codes of the articles W that are stored in the second container C2, in association with each other.

Arrangement order information is transmitted to the control device H from a plurality of shipping destinations. The arrangement order information includes code information that indicates product codes that are respectively set for the types of articles W, and number information that indicates, for each of the product codes indicated by the code information, the number of articles W of the type that corresponds to the product code. The pieces of arrangement order information are each assigned an order number according to the order in which the pieces of information have been transmitted from shipping destinations.

Image capture information of a first image capturing device 8 and image capture information of a second image capturing device 9 are transmitted to the control device H. The first image capturing device 8 is installed so as to be able to capture an image of an article W that is stored in a first container C1 that is located at the first position P1. The control device H is configured to determine the orientation and the position of an article W that is stored in a first container C1 that is located at the first position P1, based on the image capture information of the first image capturing device 8. The second image capturing device 9 is installed so as to be able to capture an image of an article W that is stored in a second container C2 that is located at the second position P2. The control device H is configured to determine the orientation and the position of an article W that is stored in a second container C2 that is located at the second position P2, based on the image capture information of the second image capturing device 9.

Figure 4:
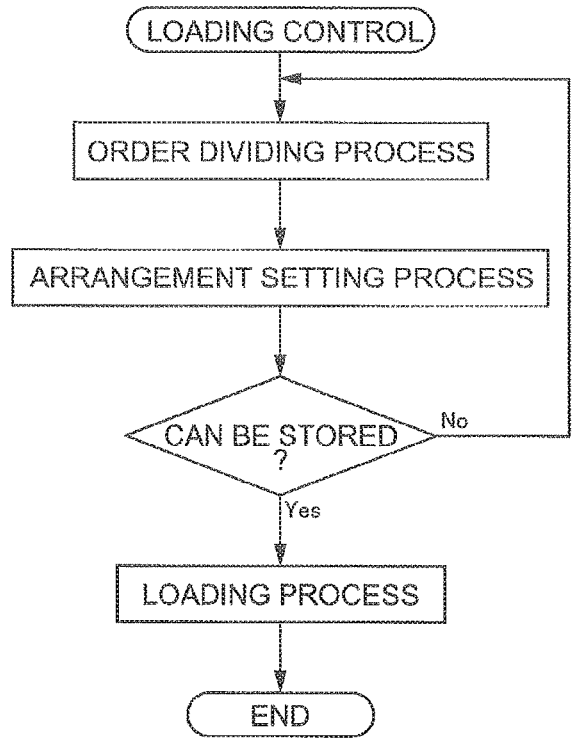
FIG. 4 is a flowchart for loading control.

As shown in FIG. 4, the control device H performs an order dividing process, an arrangement setting process, and a transport and transfer process (the loading process) in this order. The order dividing process is a process for setting the number of first containers C1 onto which load-target articles W indicated by the arrangement order information are to be loaded. The arrangement setting process is a process for setting, for each of one or more target articles TW that are to be stored in one first container C1, the arrangement information that indicates the orientation and the position of the corresponding target article TW relative to the first container C1. The transport and transfer process (the loading process) is a process for controlling the first transport device 1, the second transport device 2, and the transfer device 3 based on the arrangement information so that one or more target articles TW is stored in a first container C1 according to the orientations and the positions indicated by the arrangement information. Note that an article W that is indicated by the arrangement order information is referred to as a load-target article W, and an article W that is to be stored in one first container C1 is referred to as a target article TW. In the case where all of the articles W indicated by the arrangement order information are to be stored in one first container C1, the load-target articles W are the same as the target articles TW.

The following are additional descriptions of the order dividing process, the arrangement setting process, and the transport and transfer process (the loading process).

Order Dividing Process

The order dividing process is a process for setting the number of first containers C1 in which load-target articles W indicated by the arrangement order information are to be stored.

Specifically, the load-target articles W are stored such that the total volume of the articles W that are to be stored in one first container C1 will be smaller than or equal to a preset volume of the first container C1 in which articles W are to be stored, based on the volume of each load-target article W and the number of load-target articles W indicated by the arrangement order information. In the present embodiment, the preset volume is 60% of the capacity of each first container C1. If the total volume of the load-target articles W indicated by the arrangement order information is smaller than or equal to 60% of the capacity of each first container C1, it is determined that the load-target articles W can be stored in one first container C1, and one is set as the number of first containers C1. If the total volume of the load-target articles W indicated by the arrangement order information is greater than 60% of the capacity of each first container C1, two or more is set as the number of first containers C1 so that the total volume of articles W that are to be stored in one first container C1 will be smaller than or equal to 60% of the capacity.

Arrangement Setting Process

In the arrangement setting process, the arrangement information is set in advance to indicate an arrangement that, after all target articles TW of a first type are stored in first containers C1, allows all target articles TW of a second type, which is different from the first type, to be stored in first containers C1, and an arrangement order setting process is performed to set a type arrangement order that indicates, when target articles TW of a plurality of types are to be stored in first containers C1 according to the arrangement information, the order in which the plurality of types are to be arranged. Note that setting the arrangement information in advance means setting the arrangement information before performing an operation to store target articles TW in first containers C1, i.e. setting the arrangement information before performing the transport and transfer process (the loading process).

In the arrangement setting process, the control device H also sets an arrangement in which target articles TW are stacked in one or more tiers in the vertical direction, and sets an arrangement in which target articles TW of the same type are preferentially arranged in the same tier if an arrangement in which target articles TW are stacked in a plurality of tiers has been set.

Figure 5:
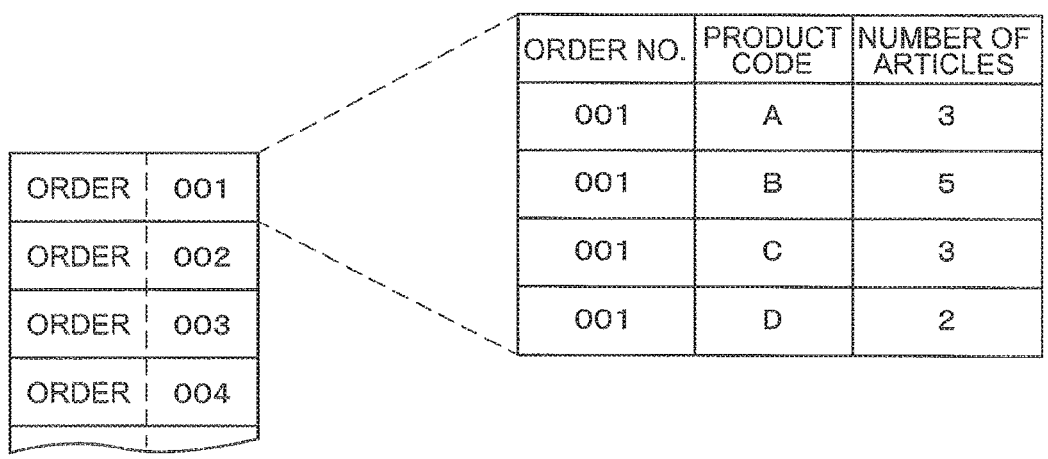
FIG. 5 is a diagram showing arrangement order information before rearrangement.

Specifically, in the arrangement setting process, an arrangement is set to load articles W (target articles TW), which are to be stored in one first container C1, to one or more tiers in the first container C1. That is, for example, as shown in FIG. 5, if articles W, which are target articles TW, have product codes A to D, the order of A, C, B, and D is set as the type arrangement order, for example. Then, the arrangement information is set to indicate an arrangement that, after all target articles TW of a first type, out of two successive types, have been stored in first containers C1, allows all target articles TW of a second type, which is different from the first type, to be stored in first containers C1. Specifically, an arrangement is set to allow all articles W with the product code C to be stored in first containers C1 after all articles W with the product code A have been stored in first containers C1, allow all articles W with the product code B to be stored in first containers C1 after all articles W with the product code C have been stored in first containers C1, and allow all articles W with the product code D to be stored in first containers C1 after all articles W with the product code B have been stored in first containers C1.

In the arrangement setting process, a plurality of arrangement patterns are created by changing the type arrangement order and the positions and orientations of articles W until a preset time has elapsed after the order dividing process has been completed. The arrangement patterns are created in this arrangement setting process by determining an arrangement from the lowest tier, and determining arrangements for all of the target articles TW.

In the arrangement setting process, an arrangement pattern in which the area of a portion that supports target articles TW, out of a supporting surface (a surface for supporting target articles TW, of the first container C1 (a surface that faces upward, of the supporting portion 11)), is the largest is preferentially selected from among the plurality of arrangement patterns that have been created as described above. If the area of the portion that supports target articles TW is the same in several arrangement patterns, an arrangement pattern that leads to the smallest height of target articles TW when target articles TW are stacked according to the arrangement pattern is preferentially selected, for example. Thus, one arrangement pattern is selected. In this way, in the arrangement setting process, an arrangement (an arrangement pattern) is set to load articles W (target articles TW), which are to be stored in one first container C1, to one or more tiers in the first container C1.

The following is an additional description of the case where an arrangement pattern in which the area of a portion that supports target articles TW, of the supporting surface, is the largest is preferentially selected in the arrangement setting process. For example, in the case where the order of A, B, C, and D is set as the type arrangement order, as shown in FIG. 6, three target articles TW with the product code A can be stored in the first tier, and then four target articles TW with the product code B can be stored in the first tier. Also, for example, in the case where the order of A, C, B, and D is set as the type arrangement order, as shown in FIG. 7, three target articles TW with the product code A can be stored in the first tier, and then three target articles TW with the product code C can be stored in the first tier. In the case where the order of A, B, C, and D is set as the type arrangement order and the case where the order of A, C, B, and D is set as the type arrangement order, the loading pattern in which the target articles TW are arranged in the order of A, C, B, and D as shown in FIG. 8, in which the area of the portion that supports the target articles TW is the largest, is preferentially selected as the type arrangement order.

In this way, in the arrangement order setting process, if an arrangement in which target articles TW of the same type are preferentially arranged in the same tier has been set in the arrangement setting process, the type arrangement order is set so that the area of the portion that supports the target articles TW, of the supporting surface, becomes the largest.

In the arrangement setting process, depending on the combination of the types and number of articles W, there are cases where the height of target articles TW is larger than the height of each first container C1 in all of the plurality of arrangement patterns that have been created as described above when the target articles TW are stacked according to the corresponding arrangement pattern. In such cases, the control device H determines that it is impossible to store articles W, and performs the order dividing process again. If the order dividing process is performed again, it is conceivable that the preset volume in the previous order dividing process (60%, for example) will be lowered (to 50%, for example).

Loading Process

Figure 9:
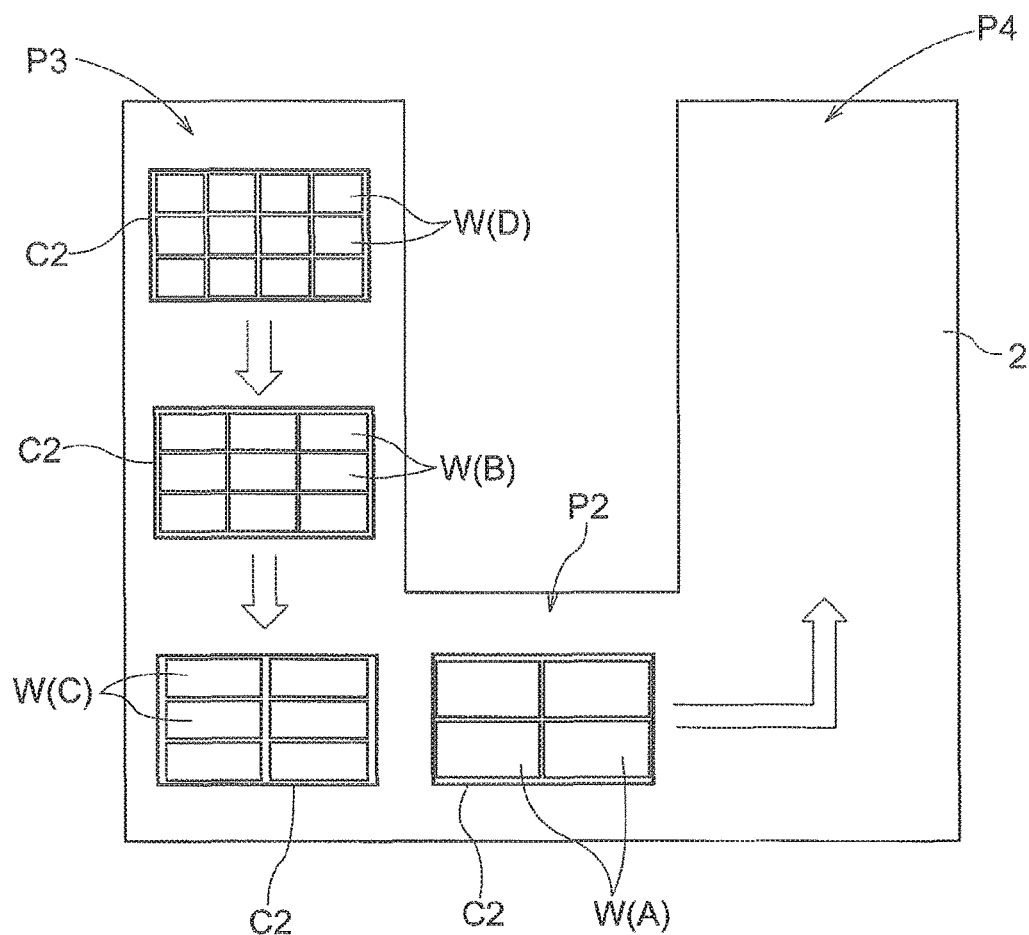
FIG. 9 is a diagram showing the order in which articles are transported to a second position.

In the loading process, a second transport control is performed to control the second transport device 2 and the stacker crane 7 to transport a second container C2 from the storage rack 6 to the second position P2, and, after all of the target articles TW stored in the second container C2 have been taken out by the transfer device 3 at the second position P2, transport the second container C2 from the second position P2 to the storage rack 6. In this second transport control, as shown in FIG. 9, a second container C2 is transported to the second position P2 such that the articles W of a plurality of types stored in the second container C2 that is to be transported to the second position P2 will be arranged in the order indicated by the type arrangement order.

Also, in the loading process, a first transport control is performed in parallel with the second transport control, to control the first transport device 1 to transport an empty first container C1 from the outside to the first position P1, and, after all of the target articles TW have been transferred to the first container C1 at the first position P1 by the transfer device 3, transport the first container C1 from the first position P1 to the outside.

Also, in the loading process, transfer control is performed to take out target articles TW that are stored in a second container C2 at the second position P2, and store the articles TW in a first container C1 at the first position P1 according to an arrangement indicated by the arrangement information.

In the loading process, the first transport control, the second transport control, and the transfer control are performed, and as a result, all of the target articles TW are transferred from one or more second containers C2 to one first container C1, and the target articles TW are stored in the first container C1 according to an arrangement indicated by the arrangement information.

In this way, it is possible to transport a plurality of articles W all at once to the second position P2 by transporting a second container C2 in which the articles W are stored to the second position P2, and it is unnecessary to transport a second container C2 in which target articles TW of the same type are stored to the second position P2 a plurality of times. Therefore, it is possible to reduce the time required to load a plurality of target articles TW into a first container C1.

Other Embodiments (1) In the above-described embodiment, if target articles TW of the same type are distributed among and supported by a plurality of second supporting members, the sets of target articles TW that are respectively supported by the plurality of second supporting members may each be treated as a set of articles of a different type. Specifically, if target articles TW with the product code A are distributed between two second supporting members, articles supported by one second supporting member may be treated as articles with a product code A', and articles supported by the other second supporting member may be treated as articles with a product code A". If this is the case, in the arrangement order setting process, the type arrangement order may be set such that the product code A and the product code A" will be next to each other, or such that articles of another type will be present between those with the product code A and the product code A".

(2) In the above-described embodiment, members that have a box shape with an open upper face are used as the first supporting member and the second supporting member. However, a member that has a plate-like shape such as a palette-like shape may be used as one or both of the first supporting member and the second supporting member, and the first supporting member and the second supporting member need only have a supporting surface onto which articles can be loaded.

(3) In the above-described embodiment, a plurality of arrangement patterns are created in the arrangement setting process until a preset time has elapsed after the order dividing process has been completed. However, it is possible to create a preset number of arrangement patterns or all conceivable arrangement patterns in the arrangement setting process.

Summary of Above-described Embodiments

The following is a summary of the above-described article loading facility.

An article loading facility includes: a loading unit that loads a plurality of target articles onto one first supporting member; a first control unit that controls the loading unit; and a setting unit that performs an arrangement setting process to set arrangement information for each of the plurality of target articles that are to be loaded onto the first supporting member, the arrangement information indicating the orientation and the position of the corresponding target article relative to the first supporting member, wherein the first control unit controls the loading unit based on the arrangement information so that the plurality of target articles are loaded onto the first supporting member according to the respective orientations and positions of the plurality of target articles indicated by the arrangement information, the article loading facility further includes: storage units that store therein second supporting members that support the target articles on a type-by-type basis; a transport unit that transports the second supporting members from the storage units to a transfer position, and transports the second supporting members from the transfer position to the storage units; and a second control unit that controls the transport unit, the loading unit takes out target articles that are supported by a second supporting member that is located at the transfer position, and loads the target articles onto the first supporting member, in the arrangement setting process, the setting unit performs an arrangement order setting process to set the arrangement information that indicates an arrangement that, after all target articles of a first type have been loaded onto the first supporting member, allows all target articles of a second type, which is different from the first type, onto the first supporting member, and to set a type arrangement order that, when target articles of a plurality of types are to be loaded according to the arrangement information, indicates the order in which the plurality of types are to be arranged, the second control unit controls the transport unit to transport the second supporting members to the transfer position according to the type arrangement order, and the first control unit controls the loading unit to load the target articles onto the first supporting member according to the arrangement information that has been set in the arrangement setting process.

With this configuration, the arrangement information and the type arrangement order that are set by the setting unit in the arrangement setting process are pieces of information that, after all of the target articles of the first type have been loaded onto the first supporting member, allows all of the target articles of the second type, which is different from the first type, to be loaded onto the first supporting member. Specifically, if there are target articles of three types, namely type A, type B, and type C, which are to be loaded onto one first supporting member, and the type arrangement order is type A, type B, and type C in the stated order, the arrangement information is as follows. That is, if type A, which comes first out of types A to C is defined as the first type, and the other types, namely types B and C, are defined as the second types, the arrangement information allows all of the articles of type A, which is the first type, to be loaded onto the first supporting member before the articles of type B and type C, which are the second types. Also, if type B, which comes first out of the remaining types B and C is defined as the first type, and the other type, namely type C, is defined as the second type, the arrangement information allows all of the articles of type B, which is the first type, to be loaded onto the first supporting member before the articles of type C, which is the second type. That is, according to the arrangement information, it is possible to load the target articles onto the first supporting member by loading all of the articles of type A, which are to be dispatched first, onto the first supporting member, then loading all of the articles of type B, which are to be dispatched next, onto the first supporting member, and thereafter loading all of the articles of type C, which are to be dispatched last, onto the first supporting member.

Then, the second control unit controls the transport unit to transport the second supporting members to the transfer position according to the type arrangement order. Specifically, if the type arrangement order indicates the order of type A, type B, and type C, the second control unit controls the transport unit such that a second supporting member on which articles of type A have been loaded is first transported to the transfer position, then a second supporting member on which articles of type B have been loaded is transported to the transfer position, and thereafter a second supporting member on which articles of type C have been loaded is transported to the transfer position. In this way, second supporting members are transported to the transfer position according to the type arrangement order, and the first control unit controls the loading unit, and consequently it is possible to load the target articles onto the first supporting member according to the arrangement information that has been set in the arrangement setting process.

Therefore, it is possible to transport a plurality of articles all at once to the transfer position by transporting a second supporting member onto which the articles have been loaded, to the transfer position, and it is unnecessary to transport a second supporting member onto which target articles of the same type have been loaded, to the transfer position a plurality of times. Therefore, it is possible to reduce the time required to load a plurality of target articles onto the first supporting member.

Here, it is preferable that, in the arrangement setting process, the setting unit sets an arrangement in which the target articles are stacked in one or more tiers in a vertical direction, and sets an arrangement in which target articles of the same type are preferentially arranged in the same tier if an arrangement in which the target articles are stacked in a plurality of tiers has been set.

With this configuration, by loading target articles onto the first supporting member based on the arrangement information that has been set in the arrangement setting process, it is possible to prevent target articles of the same type from being stacked in a block pattern, and to stably stack target articles in a plurality of tiers on the first supporting member.

Note that the block pattern is a pattern in which, when two articles are stacked one on the other, the lower surface of the article in the upper tier entirely overlaps a portion or the entirety of the upper surface of the article in the lower tier.

It is also preferable that a surface of the first supporting member, the surface being for supporting the target articles, is defined as a supporting surface, and if an arrangement in which target articles of the same type are preferentially arranged in the same tier is set in the arrangement setting process, the setting unit performs the arrangement order setting process to set the type arrangement order so that the area of a portion that supports the target articles, of the supporting surface, becomes the largest.

With this configuration, by stacking the target articles on the first supporting member according to the arrangement indicated by the arrangement information, effectively using the area of the supporting surface of the first supporting member, it is possible to stack target articles such that the lowermost tier of the target articles when stacked on the first supporting member expands in horizontal directions, and to stably stack the target articles such that the height is low.

It is also preferable that, if target articles of the same type are distributed among and supported by a plurality of second supporting members, the second control unit controls the transport unit to successively transport the plurality of second supporting members that support the target articles of the same type to the transfer position.

With this configuration, if there are many target articles of one type, one second supporting member does not suffice, and there is the possibility of articles of the same type being distributed among and supported by two or more second supporting members. Even in such a case, by successively transporting the second supporting members that support articles of the same type to the transfer position, it is possible to load the target articles onto the first supporting member according to the arrangement indicated by the arrangement information.

It is also preferable that the first supporting member and the second supporting members are formed so as to have a box shape with an open upper face, and the loading unit includes a sucking portion that sucks and supports an upper surface of each target article, the upper surface being a surface that faces upward.

With this configuration, by loading articles on a supporting portion that constitutes the bottom surface of the first supporting member, it is possible to load articles onto the first supporting member such that the articles are less likely to fall off from the first supporting member. Similarly, by loading articles onto supporting portions that constitute the bottom surfaces of the second supporting members, it is possible to load articles onto the second supporting members such that the articles are less likely to fall off from the second supporting members. An article that has been loaded onto a second supporting member is moved in the state of being sucked by the sucking portion, and is released from the sucked state when the article is located above the first supporting member. Thus, it is possible to load the article onto the first supporting member.

What is claimed is:

1. An article loading facility comprising:
a loading unit that loads a plurality of target articles onto one first supporting member;
a first control unit that controls the loading unit; and
a setting unit that performs an arrangement setting process to set arrangement information for each of the plurality of target articles that are to be loaded onto the first supporting member, the arrangement information indicating the orientation and the position of the corresponding target article relative to the first supporting member,
wherein:
the first control unit controls the loading unit based on the arrangement information so that the plurality of target articles are loaded onto the first supporting member according to the respective orientations and positions of the plurality of target articles indicated by the arrangement information,
the article loading facility further includes: storage units that store therein second supporting members that support the target articles on a type-by-type basis; a transport unit that transports the second supporting members from the storage units to a transfer position, and transports the second supporting members from the transfer position to the storage units; and a second control unit that controls the transport unit,
the loading unit takes out target articles that are supported by a second supporting member that is located at the transfer position, and loads the target articles onto the first supporting member,
in the arrangement setting process, the setting unit performs an arrangement order setting process to set the arrangement information that indicates an arrangement that, after all target articles of a first type have been loaded onto the first supporting member, allows all target articles of a second type, which is different from the first type, onto the first supporting member, and to set a type arrangement order that, when target articles of a plurality of types are to be loaded according to the arrangement information, indicates the order in which the plurality of types are to be arranged,
the second control unit controls the transport unit to transport the second supporting members to the transfer position according to the type arrangement order, and
the first control unit controls the loading unit to load the target articles onto the first supporting member according to the arrangement information that has been set in the arrangement setting process.

2. The article loading facility according to claim 1, wherein, if target articles of the same type are distributed among and supported by the plurality of second supporting members, the second control unit controls the transport unit to successively transport the plurality of second supporting members that support the target articles of the same type to the transfer position.

3. The article loading facility according to claim 1,
wherein the first supporting member and the second supporting members are formed so as to have a box shape with an open upper face, and
wherein the loading unit includes a sucking portion that sucks and supports an upper surface of each target article, the upper surface being a surface that faces upward.

4. The article loading facility according to claim 1,
wherein the second supporting members are stored in the storage units while supporting one or more articles of the same type,
when the second supporting members are transported to the transfer position, the second control unit controls the transport unit so as to transport the second supporting members stored in the storage units to the transfer position while the second supporting members support the one or more articles, and
after the loading unit takes out all of the target articles included in the one or more articles from the second supporting members, the second control unit controls the transport unit so as to transport the second supporting members from the transfer position to the storage units.

5. The article loading facility according to claim 1,
wherein the target articles are formed so as to have a rectangular parallelepiped external shape, and
in the arrangement setting process, the setting unit sets an arrangement in which the target articles are stacked in a plurality of tiers.

6. The article loading facility according to claim 1,
wherein, in the arrangement setting process, the setting unit sets an arrangement in which target articles of the same type are preferentially arranged in the same tier if an arrangement in which the target articles are stacked in a plurality of tiers has been set.

7. The article loading facility according to claim 6,
wherein a surface of the first supporting member, the surface being for supporting the target articles, is defined as a supporting surface, and if an arrangement in which target articles of the same type are preferentially arranged in the same tier is set in the arrangement setting process, the setting unit performs the arrangement order setting process to set the type arrangement order so that the area of a portion that supports the target articles, of the supporting surface, becomes the largest.

8. The article loading facility according to claim 7,
wherein the target articles are formed so as to have a rectangular parallelepiped external shape,
the first supporting member includes a supporting portion that has a rectangular shape and side wall portions that respectively stand upright on four sides that constitute an outer edge of the supporting portion,
the supporting surface is a surface of the supporting portion that faces upward, and
in the arrangement setting process, the setting unit sets the arrangement information so as to make four sides, which constitute an outer edge of the target article, parallel respectively to the four sides, which constitute the outer edge of the supporting portion, when viewed in the vertical direction.

9. The article loading facility according to claim 7,
wherein in the arrangement order setting process, when the plurality of the type arrangement orders exist which have the same area of a portion of the supporting surface that supports the target articles, the setting unit selects preferentially the type arrangement order with low height of the target articles when stacked.

* * * * *